United States Patent [19]
Kato et al.

[11] Patent Number: 5,630,373
[45] Date of Patent: May 20, 1997

[54] ANALOG INDICATOR WITH SELF-LUMINESCENT POINTER

[75] Inventors: Miki Kato, Kariya; Kazuhiko Miyazaki, Aichi-ken, both of Japan

[73] Assignee: Nippondenso Co., Ltd., Kariya, Japan

[21] Appl. No.: 342,004

[22] Filed: Nov. 16, 1994

Related U.S. Application Data

[63] Continuation-in-part of Ser. No. 108,516, Aug. 18, 1993, Pat. No. 5,372,087.

[30] Foreign Application Priority Data

Aug. 24, 1992 [JP] Japan ..................... 4-224413

[51] Int. Cl.$^6$ ................................ G01D 13/22
[52] U.S. Cl. ........................ 116/288; 116/286
[58] Field of Search .................. 116/286, 287, 116/288, 328, 332, DIG. 6, DIG. 36; 362/29; 368/238

[56] References Cited

U.S. PATENT DOCUMENTS

| | | |
|---|---|---|
| 2,792,803 | 5/1957 | Hardesty . |
| 3,066,643 | 12/1962 | Flanagan, Jr. . |
| 3,219,008 | 11/1965 | Harris et al. . |
| 4,163,428 | 8/1979 | Ishikawa . |
| 4,215,647 | 8/1980 | Fukasawa ................... 116/286 |
| 4,257,084 | 3/1981 | Reynolds ..................... 362/31 |
| 5,161,872 | 11/1992 | Sasaki et al. . |
| 5,211,128 | 5/1993 | Katoh et al. . |
| 5,372,087 | 12/1994 | Kato et al. ................... 116/288 |

FOREIGN PATENT DOCUMENTS

| | | | |
|---|---|---|---|
| 2298818 | 12/1990 | Japan | ..................... 116/328 |
| 4204323 | 7/1992 | Japan . | |
| 4208813 | 7/1992 | Japan . | |

*Primary Examiner*—William A. Cuchlinski, Jr.
*Assistant Examiner*—Willie Morris Worth
*Attorney, Agent, or Firm*—Cushman, Darby & Cushman IP Group of Pillsbury Madison & Sutro LLP

[57] ABSTRACT

A self-luminescent indicator which may be employed in a tachometer, a speedometer, or other such gauges in automotive vehicles. The self-luminescent indicator comprises an indicating pointer, a luminescent element for emitting light, and a lens. The luminescent element is disposed in the indicating pointer. The lens is arranged in the indicating pointer and includes a flat surface through which light emitted from the luminescent element enters and a corrugated surface which projects the light entering the flat surface out of the indicating pointer. With this arrangement, the indicating pointer projects the light having uniform and high brightness to an observer for improving the visibility of pointer deflection over a dial plate.

17 Claims, 8 Drawing Sheets

ANALOG INDICATOR WITH SELF-LUMINESCENT POINTER

This application is a continuation-in-part of application Ser. No. 08/108,516, filed Aug. 18, 1993, now U.S. Pat. No. 5,372,087.

BACKGROUND OF THE INVENTION

1. Technical Field of the Invention

The present invention relates generally to an improvement on an analog indicator which may be employed in a tachometer, a speedometer, or other such gauges in an automotive vehicle. More particularly, the invention is directed to an analog indicator including a self-luminescent indicating pointer which is designed to project light, having uniform brightness, so as to clearly illuminate the indicator's deflection to an observer.

2. Background Art

Japanese Patent First Publication No. 4-204323, assigned to the same assignee as the present application, discloses a self-luminescent pointer device for a gauge which may be used with an automotive speedometer or a tachometer. This conventional pointer device includes a plurality of light emitting diodes (LEDs) arranged in an indicating pointer to improve the visibility of pointer deflection over a dial plate. The present invention represents an improvement on a pointer structure taught in this prior art for projecting light having uniform and high brightness out of an indicating pointer so as to further enhance the visibility of pointer deflection over a dial plate.

SUMMARY OF THE INVENTION

It is an object of the present invention to provide an analog indicator which is simple in design and which is designed to project light to an observer light having uniform and high brightness, and which clearly illuminates pointer deflection over a dial plate.

According to one aspect of the present invention, there is provided a self-luminescent indicator apparatus which comprises an indicating pointer, a luminescent element disposed in the indicating pointer, and a lens, disposed in the indicating pointer, having a corrugated surface formed to direct light emitted from the luminescent element out of the indicating pointer.

In the preferred mode, the lens further has a substantially flat surface which is formed opposite the corrugated surface and into which the light emitted from the luminescent element goes.

The corrugated surface of the lens is geometrically oriented to allow the light entering the flat surface at a first incident angle to emerge at a second refractive angle smaller than the first incident angle.

The corrugated surface is formed with a plurality of triangle pole-like protrusions arranged parallel to each other.

The lens has a preselected length laying over the luminescent element. The triangle pole-like protrusions each extend perpendicular to the length of the lens.

The corrugated surface has peak portions and bottom portions defined by adjacent surfaces respectively which are inclined at approximately 90 deg to each other.

According to another aspect of the invention, there is prodded a self-luminescent indicator apparatus which comprises an indicating pointer having a housing and a cover for covering the housing, a luminescent element disposed in the housing of the indicating pointer, and a lens interposed between the cover of the indicating pointer and the luminescent element within the housing, the lens having a flat surface which light emitted from the luminescent element enters and a corrugated surface which projects the light entering the flat surface out of the indicating pointer.

In the preferred mode, the corrugated surface of the lens is formed with a plurality of triangle pole-like protrusions arranged parallel to each other.

The housing of the indicating pointer includes a bottom and side walls defining a substantially C-shaped cross section. The bottom has disposed thereon the luminescent element. The lens is retained by end portions of the side walls which define an opening.

The end portions of the side walls of the housing have shoulder portions respectively in which the luminescent element is retained.

The housing of the indicating pointer has a predetermined length. The luminescent element includes a plurality of light-emitting elements arranged along the length of the housing.

The cover of the indicating pointer has a semitransparent portion which diffuses the light transmitted through the lens outwardly.

The groove of the housing has a given length to have the luminescent element disposed therein along the given length. The groove forms an opening oriented to the semitransparent portion of the cover and has a preselected width substantially equal to that of the groove of the housing.

The corrugated surface has peak portions and bottom portions. The peak portions and the bottom portions are defined by adjacent surfaces respectively which are inclined at approximately 90 deg to each other.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
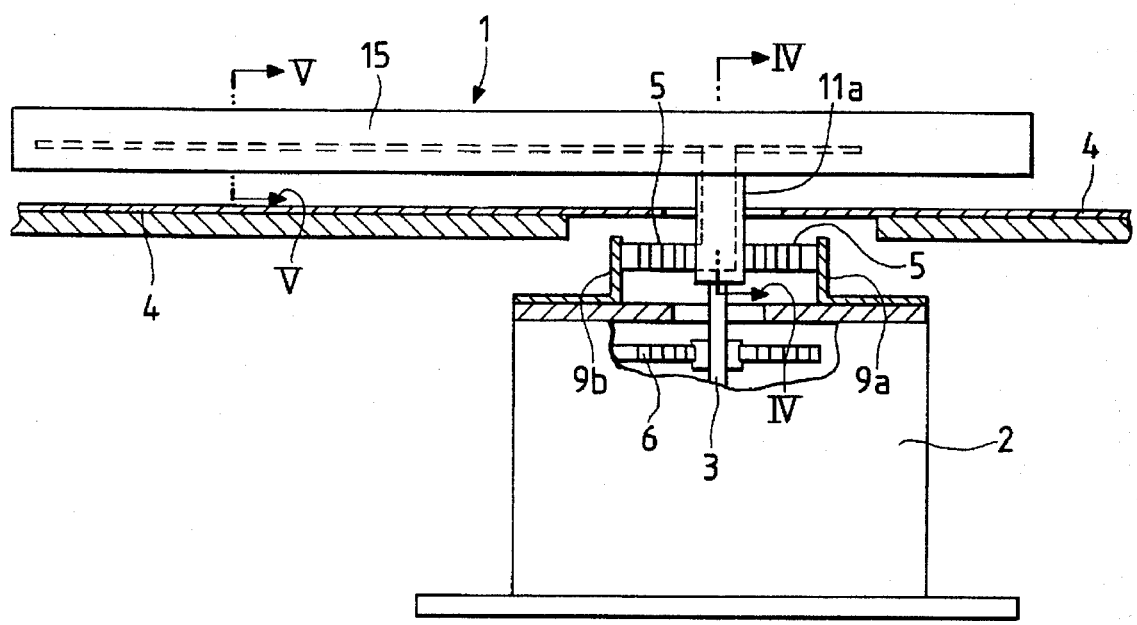
FIG. 1 is a partial cross sectional view which shows a self-luminescent indicator according to the present invention.

Referring now to the drawings, wherein like numbers refer to like parts in several views, particularly to FIG. 1, there is shown a self-luminescent indicator apparatus according to the present invention which may be employed in a tachometer or a speedometer for automotive vehicles, for example.

Figure 2:
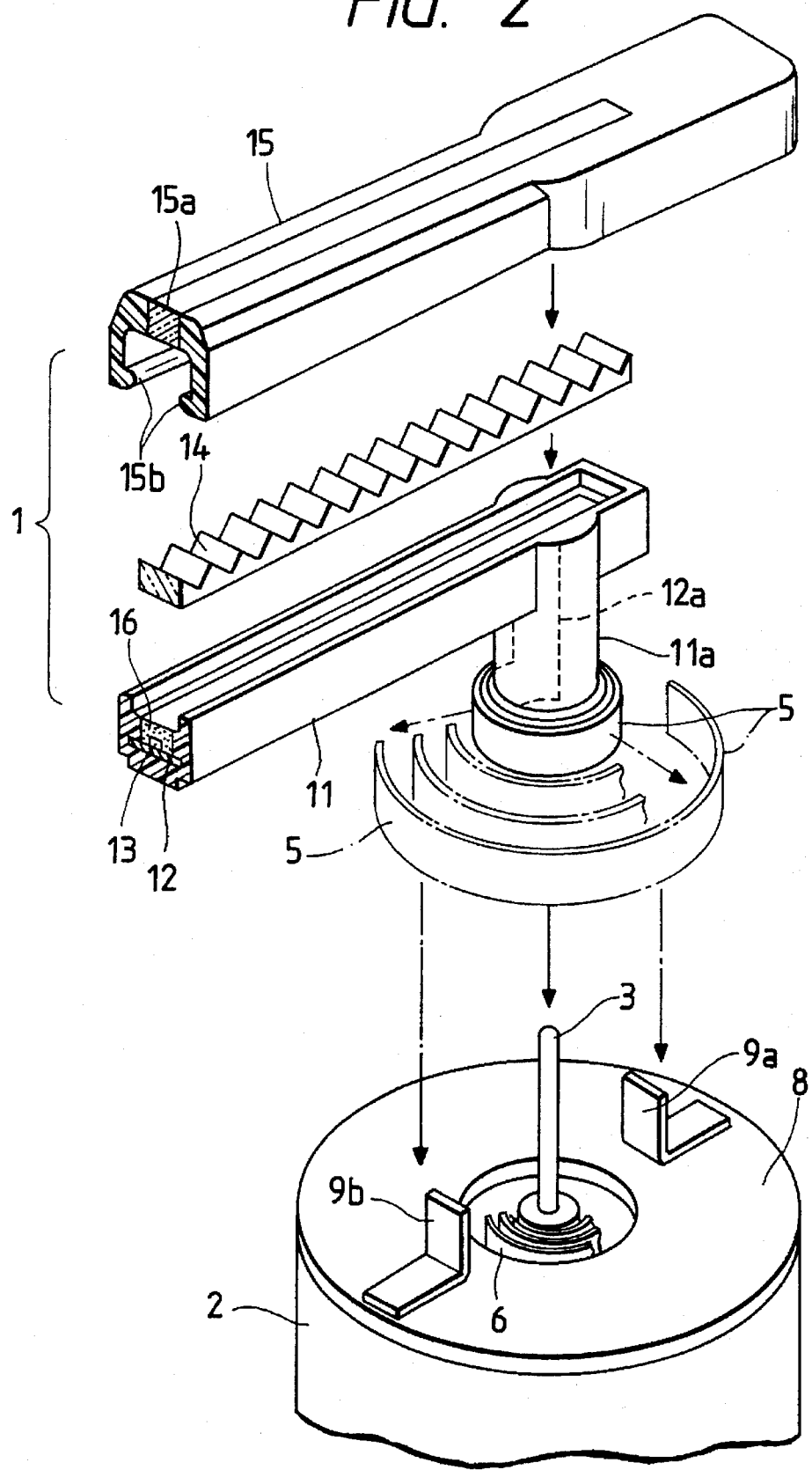
FIG. 2 is an exploded perspective view which shows the self-luminescent indicator as shown in FIG. 1.
Figure 3:
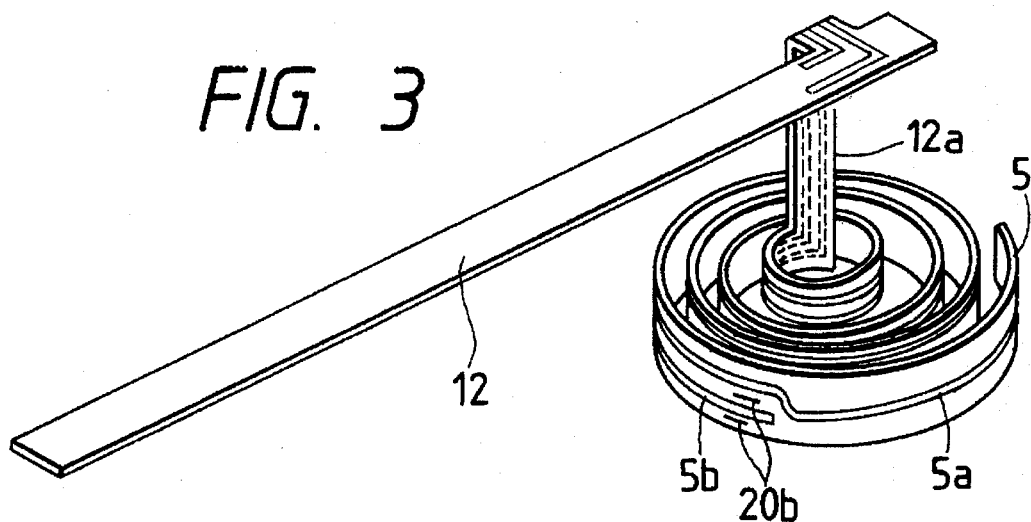
FIG. 3 is a perspective view which shows flexible printed circuits 12 and 5.
Figure 4:
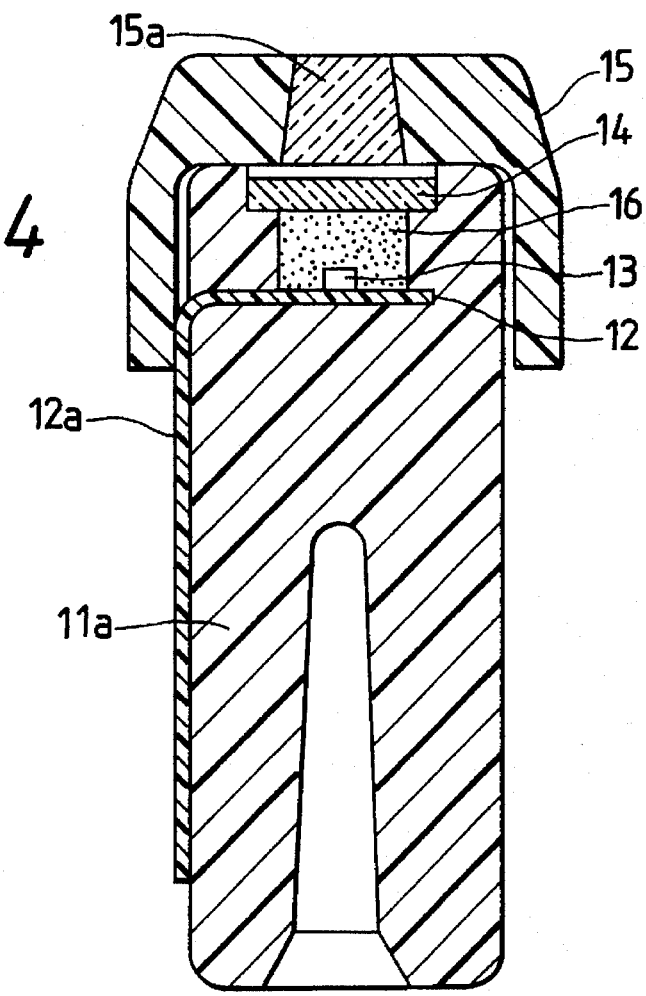
FIG. 4 is an enlarged cross sectional view taken along the line IV—IV in FIG. 1.

The self-luminescent indicator apparatus includes generally a pointer driving unit 2 secured to a meter casing (not shown), a pointer support shaft 3 extending upward from the pointer driving unit, a self-luminescent indicating pointer 1 supported on a top end of the pointer support shaft 3, a flexible printed circuit 5 (hereinafter, referred to as an FPC), and a character display plate 4 (i.e., a dial) on which notches are printed. The FPC 5 is, as shown in FIGS. 2 and 3, provided with a strip plate which is wound around an outer surface of the pointer support shaft several times on a plane in a scroll fashion and which electrically communicates with self-luminescent elements such as light emitting diodes (LEDs) arranged within the indicating pointer 1.

The pointer driving unit 2 is of a cross coil type which is responsive to an input signal representative of an indicating parameter such as engine or vehicle speeds to provide torque to the pointer support shaft 3. A hairspring 6 is attached to its end to the pointer support shaft 3 for providing a reaction force against the torque produced by the cross coil so that the indicating pointer 1 is held at a position where the torque by the cross coil and spring forces of the scroll FPC 5 and the hairspring 6 are balanced.

The self-luminescent indicating pointer 1, as shown in FIGS. 2 to 5, includes a housing 11, a flexible printed circuit (FPC) 12 arranged in the housing 11 extending in a longitudinal direction, a plurality of LEDs 13, a transparent synthetic resin member 16 arranged on the FPC 12 a dioptric lens 14 disposed on the resin member 16, and a cover 15 put on the housing 11.

Figure 5:
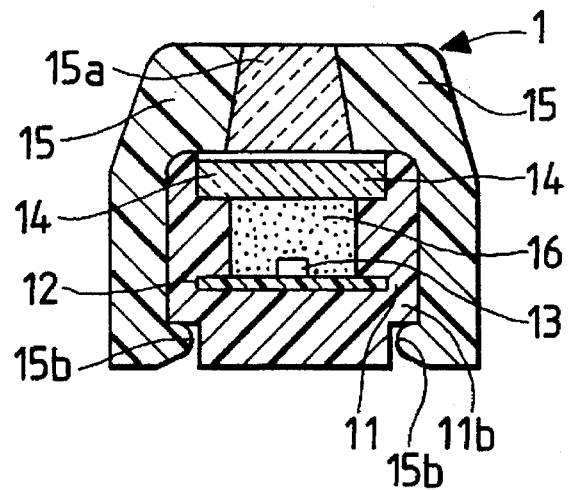
FIG. 5 is an enlarged cross sectional view taken along the line V—V in FIG. 1.

The housing 11 is made of a synthetic resin and includes a square rod member having therein a groove extending in a longitudinal direction and a boss 11a integrally formed on an end portion of the rod member projecting downward therefrom. A bore 11c is formed in the bottom portion of the boss 11a into which the pointer support shaft 3 is inserted for rotatably supporting the indicating pointer 1. On the both lower edges of the housing 11, as shown in FIG. 5, shoulder portions 11b are formed. The FPC 12 arranged in the groove of the housing 11 may be provided in a manner wherein an insert (i.e., FPC 12) is disposed within a mould when forming the housing 11.

The cover 15 is made of a black synthetic resin and includes, as shown in FIG. 2, in a longitudinally central portion a semitransparent strip portion 15a made of a translucent medium which assumes luminous diffusion characteristics. On both longitudinal edge portions of the cover 15, hook portions 15b are formed which project inward for firm engagement with the shoulder portions 11b of the housing 11.

The FPC 12 disposed in the housing 11 has thereon a conductive pattern on which the LEDs 13 are mounted at regular intervals. Additionally, the FPC 12 is, as shown in FIG. 3, formed integrally with the scroll FPC 5 through a connecting FPC 12a extending in parallel to the boss 11a.

Figure 6:
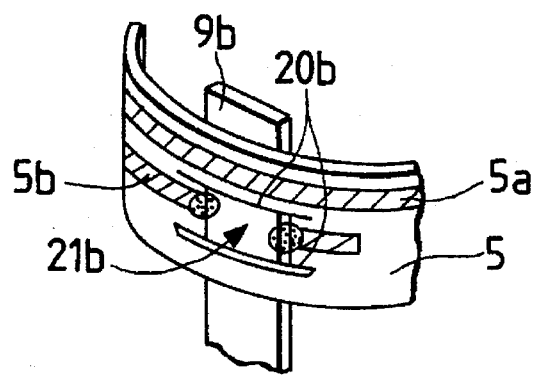
FIGS. 6 and 7 are enlarged perspective views which show terminal portions of a flexible printed circuit 5.
Figure 7:
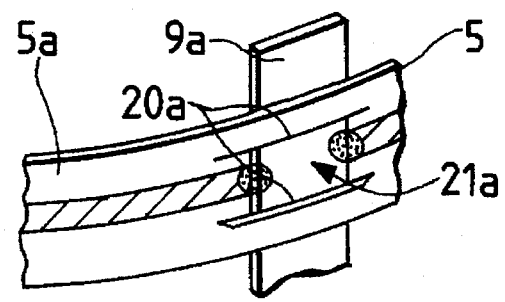
Figure 8:
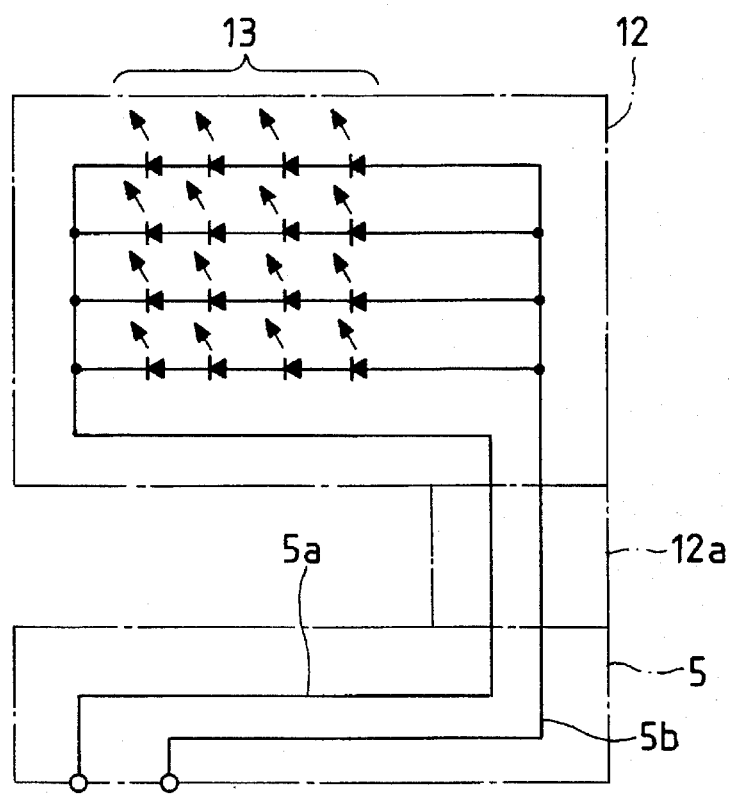
FIG. 8 is a circuit diagram which shows a conductive pattern of a flexible printed circuit 12 on which light emitting diodes are mounted.

The FPCs 5, 12, and 12a may be formed in a manner wherein a conductive pattern made of a copper film is formed over a surface of a base film made of a polyimide resin and an insulating film is then coated on an area of the conductive pattern other than terminals 21a and 21b, as shown in FIGS. 3, 6, and 7.

As stated above, on the conductive pattern of the FPC 12, a plurality of rows each including some LEDs 13 arranged in series are mounted in parallel at regular intervals between positive and negative lead wires 5a and 5b which are printed over surfaces of the FPC 12, the connecting FPC 12a and the scroll FPC 5 in lengthwise directions thereof.

The printed lead wire 5b, as shown in FIG. 3. terminates at a position apart from the end of the scroll FPC while the printed lead wire 5a leads to the end thereof. When mounting the FPC 5 on the pointer driving unit 2, two terminal plates 9a and 9b secured on a terminal disc 8 of the pointer driving unit are, as shown in FIGS. 6 and 7, inserted into two pairs of slits 20a and 20b each formed in portions of the FPC 5 adjacent the ends of the printed wires 5a and 5b respectively and contact areas of the terminal plates 9a and 9b with the printed lead wires 5a and 5b are then soldered to electrically connect therebetween. The terminal plates 9a and 9b are connected to an indicator lighting circuit (not shown) so that lighting current is supplied to the LEDs 13 through the lead wires 5a and 5b.

Figure 9:
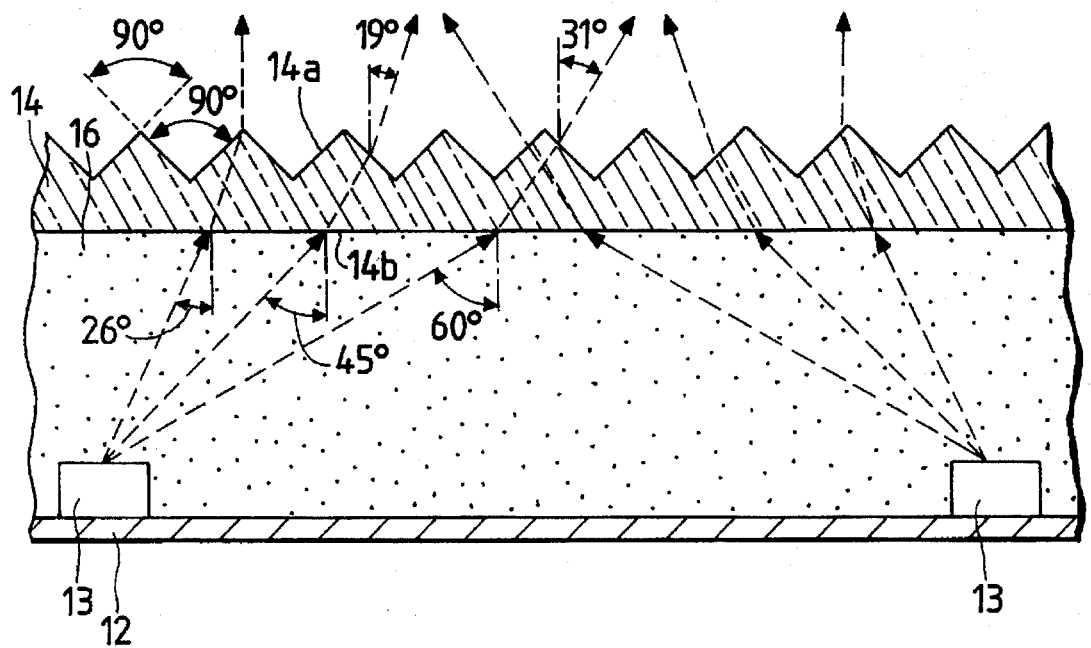
FIG. 9 is a cross sectional view which shows optical paths of lights refracted by a lens 14 which are emitted from LEDs mounted on a flexible printed circuit 12.

The lens 14 disposed on the transparent synthetic resin member 16, as shown in FIG. 9, includes a bar member having thereon corrugated, or notched surface 14a wherein angles of top ends and bottoms of the notched surface 14a represent 90 deg. respectively so that lights emitted from the LEDs 13 are projected to be uniform in brightness from the semitransparent strip portion 15a of the indicating pointer 1 in a longitudinal direction thereof.

When mounting the self-luminescent indicating pointer 1 on the pointer driving unit 2, the scroll FPC 5 is first temporarily tacked to the outer periphery of the boss 11a. The lens 14 is, as shown in FIG. 2, then fitted into the upper groove of the housing 11, after which the cover 15 is put on the housing 11 with the hook portion 15b engaging the shoulder portions 11b. Afterwards, the pointer support shaft 3 projecting from the pointer driving unit 2 is pressed into the bore 11c of the boss 11a so that the indicating pointer 1 is rotatably supported by the pointer driving unit 2. Finally, the temporal tack of the scroll FPC 5 to the boss 11a is released. The terminal plates 9a and 9b of the pointer driving unit 2 are, as shown in FIGS. 6 and 7, then inserted into the slits 20a and 20b of the FPC 5 and these are firmly fixed to each other.

In operation, when the cross coil of the pointer driving unit 2 is energized according to an input signal indicative of an indicating parameter, it will cause the self-luminescent indicating pointer 1 to be rotated while the scroll FPC 5, secured between a rotatable member (i.e., the indicating pointer) and a stationary member (i.e., the terminal disc 8 of the pointer driving unit 2), is deformed, or flexed and held at a position where the driving torque of the pointer driving unit 2 is balanced with the reaction torques produced by the scroll FPC 5 and the hairspring 6 of the pointer driving unit 2 to point toward an indicating parameter value on the display plate 4. In this arrangement, a Young's modulus of the scroll FPC 5 is much smaller than that of the hairspring 6 and thus the indicating pointer 1 may be rotated by torque similar to a conventional type without affecting the indicating accuracy of the indicating pointer 1.

Additionally, it is often the case that the scroll FPC 5 is rotated considerably to cause adjacent scroll surfaces of the FPC 5 to contact with each other, however as the conductive pattern of the FPC 5 is covered with the insulating film, a short circuit as well as noise with which an observer feels uncomfortable do not occur.

The LEDs 13 in the indicating pointer 1 are responsive to lighting current carried from the lighting circuit (not shown) through the terminal plates 9a and 9b, the scroll FPC 5, and the connecting FPCs 12a and 12 to be energized so that they glow to produce light which is dispersed from the semi-transparent portion 15a of the cover 15 of the indicating pointer 1 toward the indicator observer in the following manner.

The light beams projected from the LEDs 13 arranged on the FPC 12, as shown in FIG. 9, enter the flat surface 14b of the lens 14 through the transparent synthetic resin member 16 at different incident angles. For example, when an incident angle represents 26 deg., the light beam is projected from the lens 14 at a refractive angle of zero, when the incident angle represents 45 deg., the refractive angle becomes 19 deg., and when the incident angle shows 60 deg., the refractive angle becomes 31 deg. It will be appreciated that the light entering the flat surface 14b of the lens 14 at any angle may be led toward the upper surface 14a of the lens 14 so that the indicating pointer 1 projects the light uniformly in brightness over a preselected length thereof.

Figure 10:
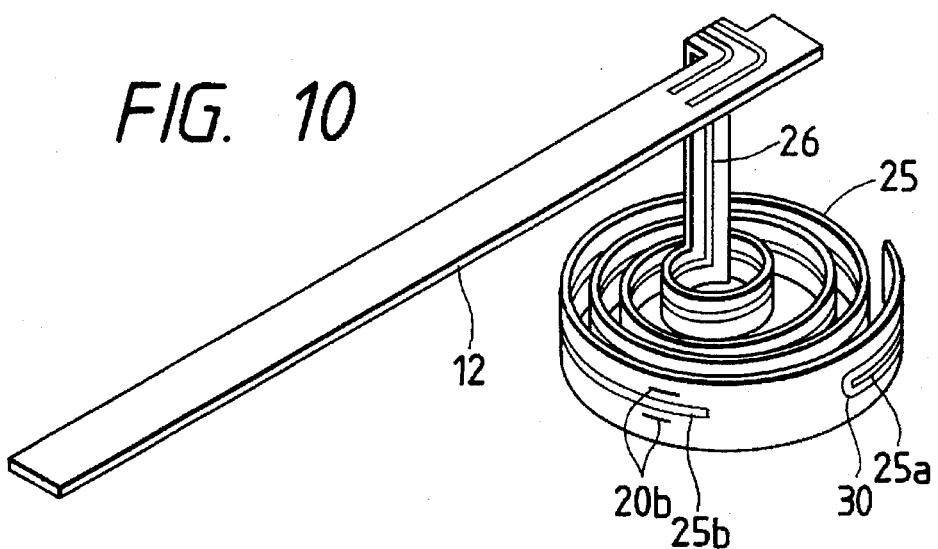
FIG. 10 is a perspective view which shows a modification of a flexible printed circuit.
Figure 11:
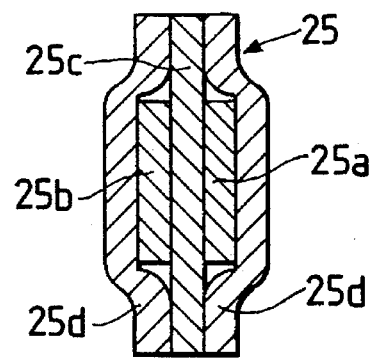
FIG. 11 is an enlarged cross sectional view which represents the flexible printed circuit as shown in FIG. 10.

Referring to FIGS. 10 and 11, there is shown a modification of the scroll FPC.

The shown FPC 25 includes a base film 25c, conductive patterns 25a and 25b, and insulating film 25d. The conductive patterns 25a and 25b are formed on both surfaces of the base film and covered with the insulating films 25d respectively. Similar to the first embodiment, the inner conductive pattern 25b extends to the end of the FPC 5, while the outer conductive pattern 25b extends to a position diametrically opposite the end of the inner conductive pattern 25b with respect to the center of the scroll. Additionally, an elongated aperture 30 is formed in the outer surface of the FPC 5 to expose the inner conductive pattern 25a outside the base film 25c to make a contact with the terminal plate 9a inserted into the slits 20a in the FPC 5 in the same manner as the first embodiment. The outer conductive pattern 25b is also connected to the terminal plate 9b through the slits 20b.

It will be noted that the arrangement of this embodiment makes it possible to substantially reduce the width of the FPC by half as compared with the first embodiment wherein the conductive pattern is formed on one side surface of the base film 5. Accordingly, the length of the pointer support shaft 3 may be shortened further.

Figure 12:
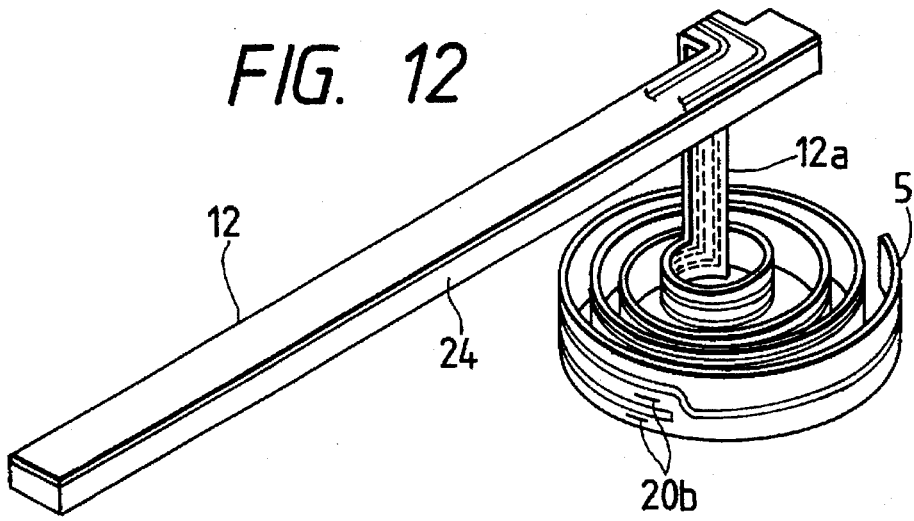
FIG. 12 is a perspective view which shows a third embodiment of a flexible printed circuit including a reinforcement member.
Figure 13:
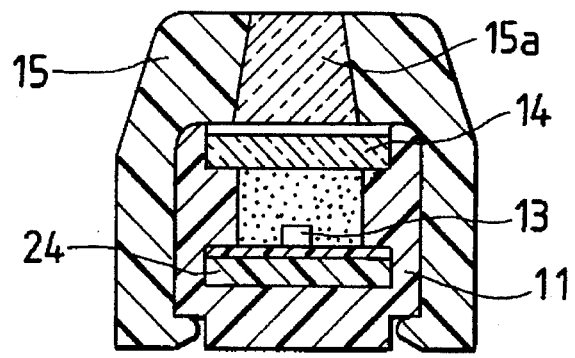
FIG. 13 is an enlarged cross sectional view which shows an indicating pointer in which the flexible printed circuit, as shown in FIG. 12, is arranged.

Referring to FIGS. 12 and 13, there is shown a third embodiment according to the present invention.

This embodiment is different from the first embodiment only in that a reinforcement member 24 is attached to a bottom surface of the FPC 12. The reinforcement member 24 may be made of an epoxy resin or the like and designed to reinforce flexibility of the FPC 12 in a lengthwise direction for preventing the indicating pointer 1 from bending and also prevents disconnection of the LEDs 13 with the FPC 12.

Figure 14:
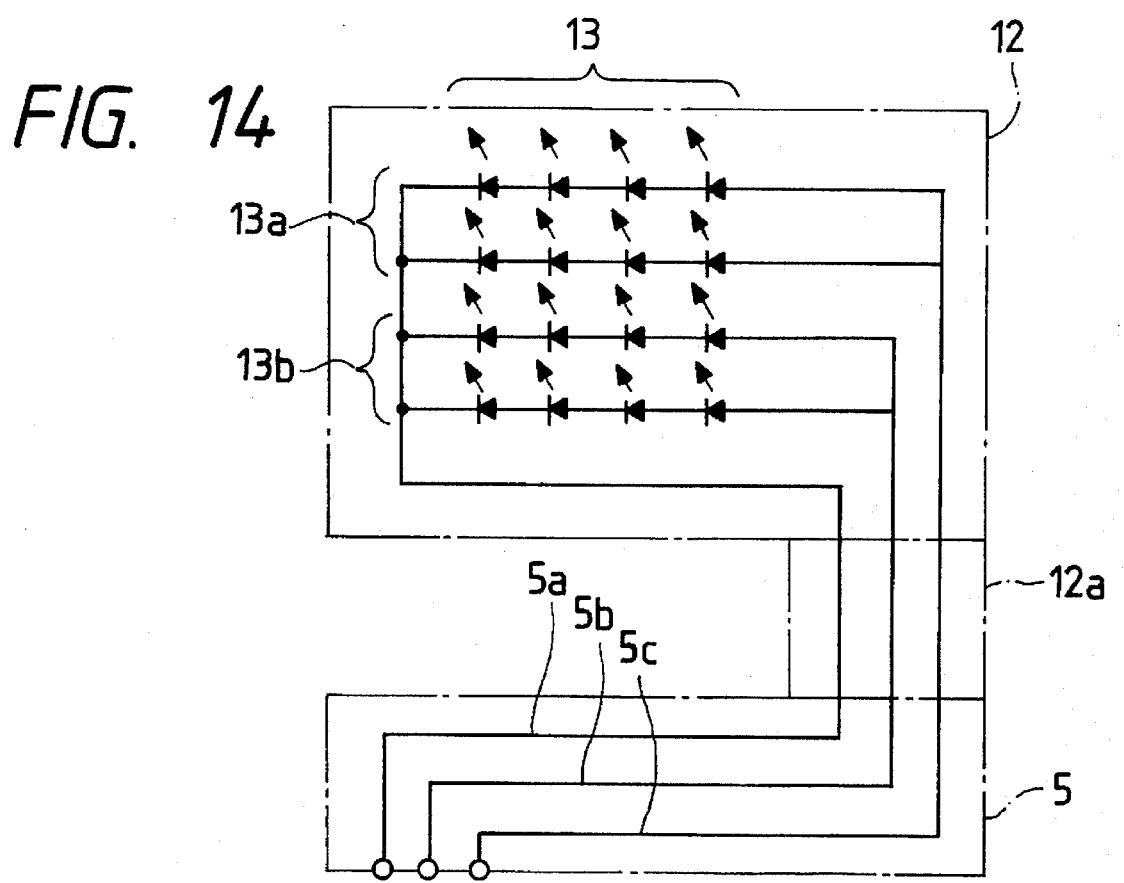
FIG. 14 is a circuit diagram which shows a modification of the conductive pattern as shown in FIG. 8.

Referring to FIG. 14, there is shown a fourth embodiment of the invention. This embodiment is different from the above embodiments in that a lead wire 5s is further printed on the FPCs 12, 12a, and 5. The lead wire 5c connects with LEDs 13a which emit light different in color from that of LEDs 13b. With this arrangement, it is possible that the indicating pointer 1 projects light in different colors according to angular positions of the indicating pointer 1 on the display plate 4. The LEDs 13a may alternatively be provided with LEDs which emit light different in brightness from that of the LEDs 13b so that the brightness of light is controlled according to the angular positions of the indicating pointer 1 on the display plate 4.

Figure 15:
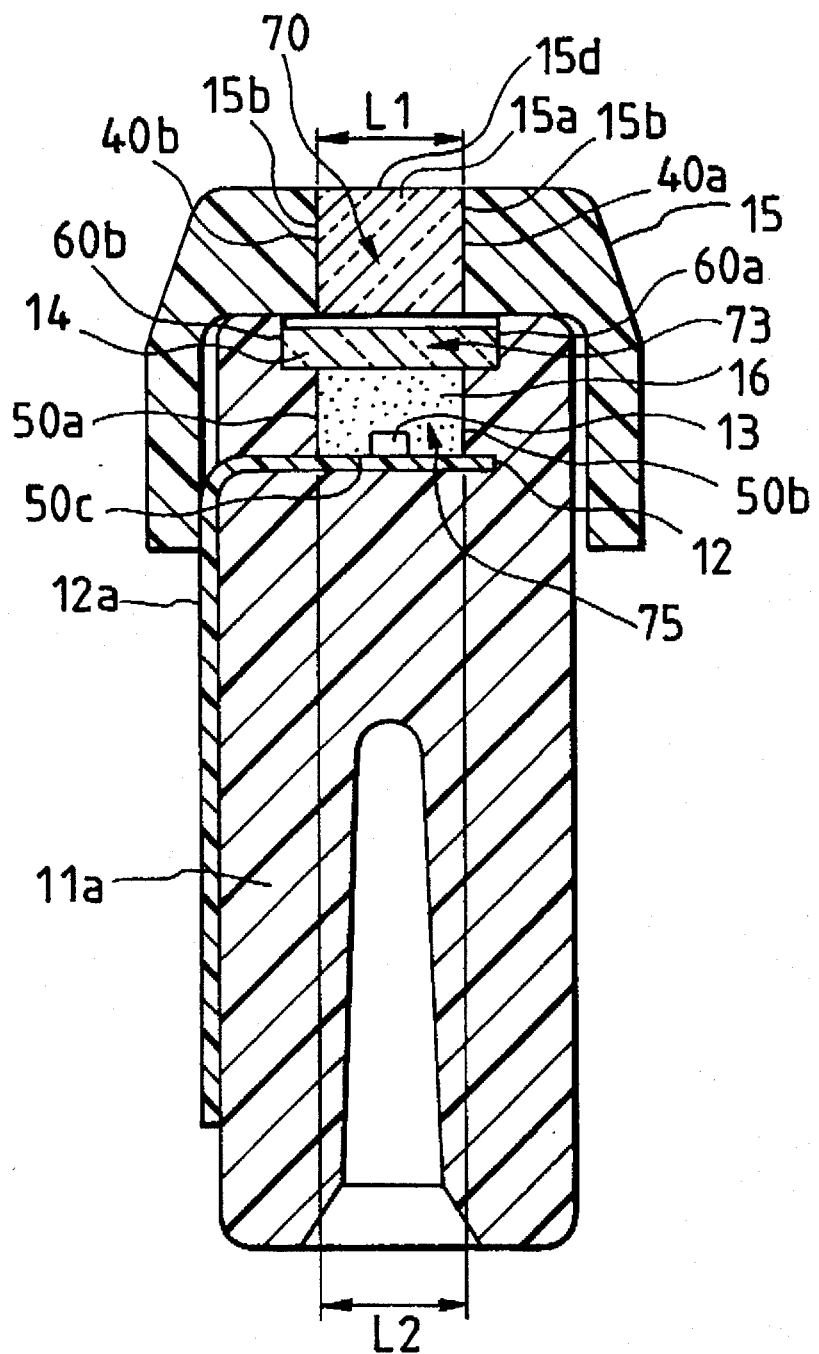
FIG. 15 is a cross sectional view which shows a modification of an indicating pointer.

Referring to FIG. 15, there is shown a modification of the indicating pointer 1 which is different from the above embodiment in structure of the cover 15.

The cover 15 has formed therein a groove 70 having a constant width L1 defined by side walls 40a and 40b extending substantially parallel to one another. The semi-transparent strip member 15a is made of a square rod having the same width L1 as that of the groove 70 of the cover 15 and is fitted in the groove 70.

The housing 11, similar to the above embodiments, has formed therein a groove 73 defined by shoulder portions 60a and 60b and a groove 75 defined by side walls 50a and 50b and a bottom 50c, both grooves extending in a lengthwise direction. The side walls 50a and 50b are oriented parallel to each other to have a constant width L2 which is substantially equal to the width L1 so that the groove 75 of the housing 11 is aligned with the groove 70 of the cover 15.

Within the groove of the housing 11, the FPC 12 is so disposed that the LEDs 13 are arranged along a given length of the groove 75.

The lens 14 is retained in the shoulder portions 60a and 60b formed in an opening end of the housing 11 along the groove 75 of the housing 11, and includes, similar to the one shown in FIG. 9, a corrugated surface 14a facing the semitransparent strip member 15a and a flat surface 14b facing the LEDs 13 through the transparent synthetic resin member 16. The corrugated surface 14a includes a plurality of triangle pole-like protrusions each extending perpendicular to the length of the lens 14.

With these arrangements, the indicating pointer 1 projects light having uniform and high brightness along a given length thereof to have an observer perceive pointer deflection clearly over the character display plate 4.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A self-luminescent indicator apparatus comprising:

an indicating pointer;

a luminescent element disposed in said indicating pointer;

means for conducting energy to said luminescent element to cause said luminescent element to emit light; and a lens disposed in said indicating pointer, said lens having a substantially flat surface and a corrugated surface opposite said flat surface, said flat surface being arranged to receive light emitted from said luminescent element and to refract the light toward the corrugated surface, the corrugated surface being arranged to direct light emitted from said luminescent element and refracted by the flat surface out of said indicating pointer.

2. A self-luminescent indicator apparatus as set forth in claim 1, wherein the corrugated surface of said lens is geometrically oriented to allow the light entering the flat surface at a first incident angle to emerge at a second refractive angle smaller than the first incident angle.

3. A self-luminescent indicator apparatus as set forth in claim 1, wherein the corrugated surface of said lens is formed with a plurality of triangle pole-like protrusions arranged parallel to each other.

4. A self-luminescent indicator apparatus as set forth in claim 3, wherein said lens has a preselected length laying over said luminescent element, the triangle pole-like protrusions each extending perpendicular to the length of said lens.

5. A self-luminescent indicator apparatus as set forth in claim 1, wherein the corrugated surface has peak portions and bottom portions, the peak portions and the bottom portions being defined by adjacent surfaces respectively which are inclined at approximately 90 deg to each other.

6. A self-luminescent indicator apparatus comprising:
an indicating pointer having a housing and a cover for covering the housing, the housing including a groove formed therein having a bottom and two opposing side walls, the cover including an opening formed therein;
a luminescent element disposed on the bottom of the groove formed in the housing of said indicating pointer;
means for conducting energy to said luminescent element to cause said luminescent element to emit light; and
a lens interposed between the cover of said indicating pointer and said luminescent element and abutting with top portions of the side walls of the groove formed in the housing, said lens having a flat surface through which light emitted from said luminescent element enters, and a corrugated surface opposite the flat surface which projects the light entering through the flat surface out of said indicating pointer through the opening formed in the cover.

7. A self-luminescent indicator apparatus as set forth in claim 6, wherein said corrugated surface of said lens is formed with a plurality of triangle pole-like protrusions arranged parallel to each other.

8. A self-luminescent indicator apparatus as set forth in claim 6, wherein the top portions of the side walls of the groove formed in the housing have shoulder portions respectively in which said lens is retained.

9. A self-luminescent indicator apparatus as set forth in claim 6, wherein the housing of said indicating pointer has a predetermined length, said luminescent element including a plurality of light-emitting elements arranged along the length of the housing.

10. A self-luminescent indicator apparatus as set forth in claim 6, wherein the opening formed in the cover of said indicating pointer has a semitransparent portion disposed therein which diffuses the light transmitted through said lens outwardly.

11. A self-luminescent indicator apparatus as set forth in claim 10, wherein the groove has a given length so that said luminescent element is disposed therein along the given length, the groove forming an opening oriented to the semitransparent portion of the cover and having a preselected width substantially equal to that of the opening of the cover.

12. A self-luminescent indicator apparatus as set forth in claim 11, wherein the corrugated surface has peak portions and bottom portions, the peak portions and the bottom portions being defined by adjacent surfaces respectively which are inclined at approximately 90 deg to each other.

13. A self-luminescent indicator apparatus as set forth in claim 1, wherein the substantially flat surface and the corrugated surface are disposed substantially parallel to each other.

14. A self-luminescent indicator apparatus as set forth in claim 6, wherein the flat surface and the corrugated surface are disposed substantially parallel to each other.

15. A self-luminescent indicator apparatus as set forth in claim 1, wherein said luminescent element is disposed in said indicating pointer at a given interval away from and facing the substantially flat surface of said lens.

16. A self-luminescent indicator apparatus as set forth in claim 15, further comprising a transparent member disposed between said luminescent element and the substantially flat surface of said lens.

17. A self-luminescent indicator apparatus as set forth in claim 6, wherein the flat surface of said lens is arranged so as to refract the light emitted by said luminescent element and entering therethrough toward the corrugated surface.

* * * * *